US009476966B2

(12) United States Patent
Sridhara et al.

(10) Patent No.: US 9,476,966 B2
(45) Date of Patent: Oct. 25, 2016

(54) METHODS AND APPARATUSES FOR USE IN SELECTING A TRANSMITTING DEVICE FOR USE IN A POSITIONING FUNCTION

(75) Inventors: Vinay Sridhara, Santa Clara, CA (US); Behrooz Khorashadi, Mountain View, CA (US); Saumitra Mohan Das, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 13/311,382

(22) Filed: Dec. 5, 2011

(65) Prior Publication Data
US 2013/0143590 A1 Jun. 6, 2013

(51) Int. Cl.
*G01S 5/14* (2006.01)
*G01S 5/02* (2010.01)

(52) U.S. Cl.
CPC . *G01S 5/14* (2013.01); *G01S 5/021* (2013.01)

(58) Field of Classification Search
CPC ........ H04W 4/023; H04W 4/04; G01S 5/14; G01S 5/021
USPC ............ 455/456.1, 4, 456.2, 456.4; 370/332, 370/349
See application file for complete search history.

(56) References Cited

U.S. PATENT DOCUMENTS

| 6,246,861 | B1 | 6/2001 | Messier et al. | |
|---|---|---|---|---|
| 8,442,557 | B2* | 5/2013 | Aggarwal | H04W 64/00 342/432 |
| 8,599,758 | B1* | 12/2013 | Ogale | H04W 4/04 370/328 |
| 8,874,131 | B2* | 10/2014 | Khorashadi | H04W 4/04 455/456.1 |

(Continued)

FOREIGN PATENT DOCUMENTS

| CN | 1867836 A | 11/2006 |
|---|---|---|
| CN | 1963561 A | 5/2007 |

(Continued)

OTHER PUBLICATIONS

International Search Report and Written Opinion—PCT/US2012/066674—ISA/EPO—Apr. 24, 2013.

(Continued)

*Primary Examiner* — Joseph Dean, Jr.
(74) *Attorney, Agent, or Firm* — Berkeley Law & Technology Group, LLP

(57) ABSTRACT

Methods and apparatuses are provided which may be implemented in various devices having one or more computing platforms to obtain signaling characteristics for one or more transmitting devices. The signaling characteristics may, for example, be based, at least in part, on one or more signals received by a receiving device from the transmitting device(s), and may comprise at least a received signal strength measurement and a propagation time measurement. Such methods and apparatuses may further be implemented to determine whether a mobile station is to use or not use positioning data for one or more transmitting device(s) in a positioning function based, at least in part, on the received signal strength measurement and the propagation time measurement.

40 Claims, 5 Drawing Sheets

(56) References Cited

U.S. PATENT DOCUMENTS

| | | |
|---|---|---|
| 2004/0246926 A1 | 12/2004 | Belcea et al. |
| 2006/0019679 A1* | 1/2006 | Rappaport ............ H04W 64/00 455/456.5 |
| 2006/0047413 A1 | 3/2006 | Lopez et al. |
| 2007/0111746 A1* | 5/2007 | Anderson ........... H04W 52/223 455/522 |
| 2007/0232328 A1* | 10/2007 | Kramarz-Von Kohout ................. H04W 4/22 455/456.2 |
| 2008/0244707 A1 | 10/2008 | Bowser et al. |
| 2009/0191894 A1* | 7/2009 | Poegel ................. G01S 5/0215 455/456.1 |
| 2010/0135178 A1* | 6/2010 | Aggarwal ............ G01S 5/0205 370/252 |
| 2010/0231363 A1 | 9/2010 | Knibbe |
| 2011/0045846 A1* | 2/2011 | Rekimoto ............ G01S 5/0018 455/456.1 |
| 2012/0190369 A1* | 7/2012 | Gao ...................... H04W 64/00 455/436 |
| 2012/0306693 A1* | 12/2012 | Edge ................... H04W 64/003 342/357.29 |

FOREIGN PATENT DOCUMENTS

| | | |
|---|---|---|
| CN | 101221696 A | 7/2008 |
| CN | 101490971 A | 7/2009 |
| WO | 2005038480 A1 | 4/2005 |

OTHER PUBLICATIONS

Ranging: RSSI versus TOF. Website: http://www.touchstone-labs.com/joomla/index.php?option=com_content&view=article&id=102:ranging-rssi-vs-tof&catid=56:ts05-hardware&itemid=96. Date Accessed: Dec. 19, 2010. 4 pages

* cited by examiner

METHODS AND APPARATUSES FOR USE IN SELECTING A TRANSMITTING DEVICE FOR USE IN A POSITIONING FUNCTION

BACKGROUND

1. Field

The subject matter disclosed herein relates to electronic devices, and more particularly to methods, apparatuses and articles of manufacture for use in various devices comprising a computing platform to select or otherwise determine whether positioning data for a transmitting device may or may not be used in a positioning function.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile stations, and particularly in outdoor environments. However, since some satellite signals may not be reliably received and/or acquired by a mobile station within an indoor environment or other like mixed indoor/outdoor environments, different techniques may be employed to enable position location services.

For example, mobile stations may attempt to obtain a position fix by measuring ranges to three or more terrestrial transmitting devices (e.g., wireless access points, beacons, cell towers, etc.) which are positioned at known locations. Such ranges may be measured, for example, by obtaining a MAC ID address from signals received from such transmitting devices and obtaining range measurements to the transmitting devices by measuring one or more characteristics of signals received from such transmitting devices such as, for example, signal strength, a round trip delay time, etc.

In certain instances, there may be a plethora of transmitting devices transmitting signals from which applicable positioning data may be obtained or derived and it may be useful to select which positioning data to use in a positioning function, e.g., that estimates a location of a mobile station.

SUMMARY

In accordance with an aspect, an example method that may be performed using at least one computing platform; the method may comprise: obtaining signaling characteristics for a transmitting device, the signaling characteristics being based, at least in part, on one or more signals received by a receiving device from the transmitting device, and comprising at least a received signal strength measurement and a propagation time measurement; and determining whether a mobile station is to use positioning data for the transmitting device in a positioning function based, at least in part, on the received signal strength measurement and the propagation time measurement.

In accordance with another aspect, an example apparatus may be provided for use in at least one computing platform; the example apparatus may comprise: means for obtaining signaling characteristics for a transmitting device, the signaling characteristics being based, at least in part, on one or more signals received by a receiving device from the transmitting device, and comprising at least a received signal strength measurement and a propagation time measurement; and means for determining whether a mobile station is to use positioning data for the transmitting device in a positioning function based, at least in part, on the received signal strength measurement and the propagation time measurement.

In accordance with yet another aspect, an example apparatus may comprise: a network interface; and a processing unit to: obtain, via the network interface, signaling characteristics for a transmitting device, the signaling characteristics being based, at least in part, on one or more signals received by a receiving device from the transmitting device, and comprising at least a received signal strength measurement and a propagation time measurement; and determine whether a mobile station is to use positioning data for the transmitting device in a positioning function based, at least in part, on the received signal strength measurement and the propagation time measurement.

In accordance with still another aspect, an example article of manufacture may be provided which comprises: a non-transitory computer readable medium having stored therein computer implementable instructions that are executable by a special purpose computing platform to: obtain signaling characteristics for a transmitting device, the signaling characteristics being based, at least in part, on one or more signals received by a receiving device from the transmitting device, and comprising at least a received signal strength measurement and a propagation time measurement; and determine whether a mobile station is to use positioning data for the transmitting device in a positioning function based, at least in part, on the received signal strength measurement and the propagation time measurement.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
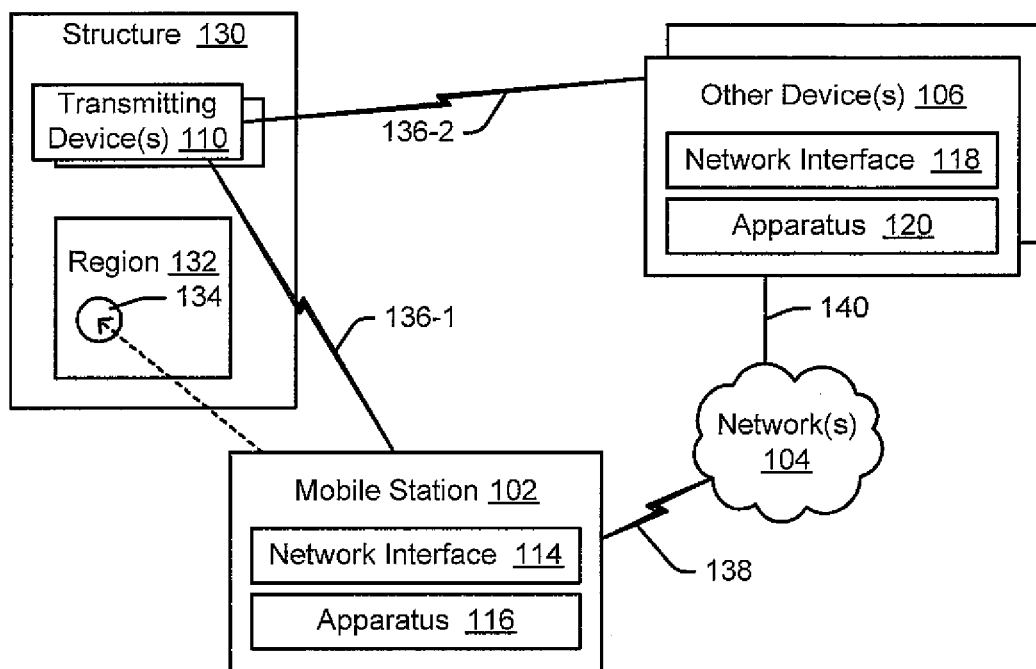
FIG. 1 is a schematic block diagram illustrating an example environment comprising various devices having one or more computing platforms to select or otherwise determine whether positioning data for a transmitting device may or may not be used in a positioning function, in accordance with an implementation.

Data processing techniques are provided herein which may be implemented as various methods, apparatuses, or otherwise provided in articles of manufacture for use with one or more electronic devices that may comprise or take the form of a special purpose computing platform.

Certain example data processing techniques as provided herein may be used, at least in part, to determine whether a mobile station should or should not make use of positioning data for a transmitting device when performing one or more positioning functions. Such a determination may be particularly useful to a positioning function that is to estimate a location of a mobile station based, at least in part, on positioning data for a plurality of transmitting devices.

For example, such a determination may be useful in situations wherein a mobile station that receives such signals may be located in a region in which signals may be received from a plethora of transmitting devices, and in which some of the received signals may provide more accurate positioning data than the other received signals. For example, certain received signals may propagate from a transmitting device to a receiving device (e.g., a mobile station) through one or more mediums that may be modeled or otherwise expected by a positioning function. Hence, the resulting positioning data obtained, at least in part, from such received signals may be more accurate or otherwise more reliable to a positioning function than positioning data from other signals that may have propagated in a different or unexpected manner. For example, in certain instances it may be more useful for a positioning function to use positioning data for transmitting devices that may be more likely to transmit signals directly to a mobile station, e.g., through an atmospheric medium without the signals propagating off of, around, or through any intervening non-atmospheric objects (e.g., walls, floors, etc.).

In certain example implementations, such techniques may be implemented in whole or in-part at one or more computing platforms. For example, in certain instances, such techniques may be implemented, at least in part, at a mobile station that may comprise or otherwise take the form of a special purpose computing platform. For example, in certain other instances, such techniques may be implemented at least in part at one or more other devices, which may comprise or otherwise take the form of a special purpose computing platform.

As such, in certain example implementations a special purpose computing platform may obtain signaling characteristics for a transmitting device. The signaling characteristics may, for example, be based, at least in part, on one or more signals received by a receiving device from the transmitting device. In certain example instances, such signaling characteristics may comprise at least a received signal strength measurement and a propagation time measurement. The special purpose computing platform may then determine whether a mobile station is to use positioning data for the transmitting device in a positioning function based, at least in part, on the received signal strength measurement and the propagation time measurement.

In certain example implementations, a special purpose computing platform may determine whether a mobile station is to use positioning data by comparing the received signal strength measurement with the propagation time measurement.

In certain example implementations, a special purpose computing platform may determine whether a mobile station is to use positioning data based, at least in part, on one or more measurement criteria. For example, a measurement criterion may comprise an acceptable measurement ratio, and a special purpose computing platform may obtain a measurement ratio that is based, at least in part, on the received signal strength measurement and the propagation time measurement, and compare the measurement ratio with the acceptable measurement ratio. For example, a measurement criterion may comprise an acceptable strength measurement threshold value, and a special purpose computing platform may compare the received signal strength measurement with the acceptable strength measurement threshold value. For example, a measurement criterion may comprise an acceptable time measurement threshold value, and a special purpose computing platform may compare the propagation time measurement with the acceptable time measurement threshold value.

In certain example implementations, in response to determining that a mobile station is to use the positioning data for a transmitting device in a positioning function, a special purpose computing platform may obtain applicable positioning data for the transmitting device and provide at least a portion of the positioning data to a positioning function. Based at least in part on the positioning data, a positioning function may, for example, determine an estimated range between a mobile station and a transmitting device, an estimated location of a mobile station with regard to a coordinate system, an estimated location of a mobile station with regard to one or more indoor regions within a structure, and/or other like positioning and/or navigation related information. Such example and other like signal-based positioning techniques are well known.

In certain example implementations, a special purpose computing platform may further obtain one or more additional signaling characteristics, e.g., for one or more other signals received from the transmitting device by at least one other receiving device, and determine whether a mobile station is to use the positioning data for the transmitting device in a positioning function further based, at least in part, on the additional signaling characteristic(s). Thus, for example, crowd-source or other archiving techniques may be implemented to gather or otherwise develop various signaling characteristics and/or models with regard to various locations, regions, structures, transmitting devices, etc., within an environment. In certain example implementations, it may be possible for one or more devices to identify particular measurements that may be of greater use in estimating a location position, and/or which may be of lesser use in estimating a location position, e.g., depending on the number of measurements available, and/or other like information regarding the particular transmitting devices, etc. Thus, for example, certain wireless signal measurements may be selected, or conversely avoided, for use in estimating location positions. For example, certain wireless signals may provide for more accurate ranging estimates, and/or the like, than might other wireless signals having greater uncertainty as to the position of the transmitting device, potential multipath propagation, etc. In certain example implementations, such information regarding the potential use and/or reliability or conversely potential non-use and/or unreliability of one or more signals from one or more transmitting devices may be recorded, reported, shared, etc., amongst one or more network devices and/or mobile devices. In certain instances, such techniques may be implemented based on a desired level of accuracy (e.g., based on one or more threshold values), etc. In certain instances, for example, a crowd-sourcing capability may be provided which specifically identifies applicable signals/transmitting devices that may be considered to be possibly more (or conversely less) useful depending on certain conditions/situations.

In certain example implementations, a special purpose computing platform may affect at least one electronic map, e.g., for a structure, based, at least in part, on one or more signaling characteristics for a transmitting device. For example, a server device may establish or otherwise maintain a signal-based heatmap, attenuation map, signal reception model, and/or the like or combination thereof for a structure, based, at least in part, on one or more signaling characteristics for a transmitting device.

A received signal strength measurement may, for example, be indicative of a received signal strength for one or more signals from a transmitting device as measured at the receiving device. In certain example instances a received signal strength measurement may be indicative of a received power level (e.g., a received signal strength indicator (RSSI), or the like). In certain example instances a received signal strength measurement may be indicative of an adjusted received power level, e.g., to account for different transmitting devices, different initial transmission power levels, to normalize measurement values, apply a weighting scheme, etc.

In still other example implementations, a received signal strength measurement may be indicative of a value derived from a received power level and/or an adjusted received power level. Thus, in certain example implementations a received signal strength measurement may be naturally, or converted to be, indicative of a value having particular unit of measure and which may be derived (e.g., determined, estimated, etc.) from a received power level and/or an adjusted received power level based on a conversion formula and/or the like. For example, in certain instances it may be useful for a received signal strength measurement to be indicative of a value having a unit of measure that is the same as a unit of measure of its corresponding propagation time measurement. Thus, in certain example implementations it may be useful for a received signal strength measurement and a propagation time measurement to be indicative of a distance value or some other unit of measure that may be compared in some manner. Thus, for example, a received signal strength measurement may be indicative of an estimated distance that a received signal may have traveled from a transmitting device to a receiving device assuming a particular environment there between; e.g., which may be derived, based at least in part, from a received power level or an adjusted received power level, and from a known or assumed initial transmitted power level, applicable transmit and/or receive antenna parameters, etc. Such example and other like signal power measurement and modeling/conversion techniques are well known.

A propagation time measurement may, for example, be indicative of an actual measurement of, or an estimate of, a period of time it takes for a signal to travel between a transmitting device and a receiving device at least one time. In certain example instances a propagation time measurement may be based, at least in part, on one or more of a round trip time (RTT), a time difference of arrival (TDOA), etc. In certain example instances a propagation time measurement may be indicative of an adjusted period of time.

In still other example implementations, a propagation time measurement may be indicative of a value derived from a period of time and/or an adjusted period of time. Thus, in certain example implementations a propagation time measurement may be indicative of a value having particular unit of measure and which may be derived (e.g., determined, estimated, converted, etc.) from a period of time and/or an adjusted period of time based on a conversion formula and/or the like. As previously mentioned, in certain instances it may be useful for a propagation time measurement to be indicative of a value having a particular unit of measure that is the same as a unit of measure of its corresponding received signal strength measurement. Thus, in certain example implementations it may be useful for a propagation time measurement and a received signal strength measurement to be indicative of a distance value, or the like. Thus, for example, a propagation time measurement may be indicative of an estimated distance that a received signal may have traveled from a transmitting device to a receiving device assuming a particular environment there between. Such example and other like signal timing measurement and modeling/conversion techniques are well known.

As used herein the term "structure" may, for example, apply to (all or part of) one or more natural and/or man-made physical arrangements of object(s), the knowledge of which may be of use to a user of mobile station. For example, a structure may comprise all or part of a building that a user of a mobile station may enter into, exit from, and/or otherwise move about within. Some example structures may comprise a mixture of indoor and outdoor spaces.

As used herein the term "region" may, for example, relate to all or part of a structure that may be distinguished in some manner. In certain instances, for example, two or more different regions may be distinguished from one another based, at least in part, on various physical arrangements of objects, e.g., floors, ceilings, decks, walls, staircases, elevators, walkways, etc. Thus, for example, two or more regions of a structure may relate to two or more different levels (e.g., floors) of a building, two or more office suites in a building, stores in a shopping mall, etc.

FIG. 1 is a schematic block diagram illustrating an example environment 100 comprising various devices having one or more computing platforms to select or otherwise determine whether positioning data for a transmitting device may or may not be used in a positioning function, in accordance with an implementation. For example, as shown environment 100 may comprise a mobile station 102, and/or one or more other devices 106 to select or otherwise determine whether positioning data for at least one transmitting device 110 may or may not be used in a positioning function. A positioning function may, for example, be used, at least in part, to estimate a location 134 of mobile station 102 with regard to at least one of a plurality of different indoor regions 132 within a structure 130 based, at least in part on the selected positioning data. Such a positioning function may, for example, be provided, in whole or part, in mobile station 102 and/or one or more other devices 106.

By way of example, mobile station 102 may comprise any electronic device that may be moved about by a user within a structure and which comprises a network interface 114 for receiving signals transmitted by transmitting devices 110 (e.g., access points, cell towers, beacons, etc.) and/or other resources in network(s) 104, etc. Thus, by way of some examples, mobile station 102 may comprise a cell phone, a smart phone, a computer (e.g., a personal computer such as a laptop computer, a tablet computer, a wearable computer, etc.), a navigation aid, a digital book reader, a gaming device, a music and/or video player device, a camera, etc.

Apparatus 116 is representative of circuitry, such as, e.g., hardware, firmware, a combination of hardware and software, and/or a combination of firmware and software or other like logic that may be provided in mobile station 102 and used, at least in part, to select or otherwise determine whether positioning data for a transmitting device 110 may or may not be used in a positioning function, in accordance with an implementation.

In certain example implementations, mobile station 102 may function exclusively or selectively as a stand-alone device, and may provide a one or more capabilities/services of interest/use to a user. In certain example implementations, mobile station 102 may communicate in some manner with one or more other devices, for example, as illustrated by the wireless communication link to the cloud labeled network(s) 104. Network(s) 104 may be representative of one or more communication and/or computing resources (e.g., devices and/or services) which mobile station 102 may communicate with or through, e.g., via network interface 114 using one or more wired or wireless communication links. Thus, in certain instances mobile station 102 may receive (or send) data and/or instructions via network(s) 104. In certain instances, mobile station 102 may, for example, not only receive a signal from a transmitting device 110, but may also transmit a signal to such a transmitting device (e.g., having a receiver).

In certain example implementations, mobile station 102 may be enabled to receive signals associated with one or more wireless communication networks, location services, and/or the like or any combination thereof which may be associated with one or more transmitting devices 110 and/or network(s) 104.

Mobile station 102 may, for example, be enabled (e.g., via network interface 114) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, mobile station 102 may be enabled (e.g., via network interface 114 or other location receiver) for use with various location service(s), such as, a Global Navigation Satellite System (GNSS), or other like satellite and/or terrestrial locating service, a location based service (e.g., via a cellular network, a WiFi network, etc.).

One or more other devices 106 is illustrated as being connected to network(s) 104 via a network interface 118, which in certain implementations may be similar to network interface 114. Other device 106 may, for example, comprise one or more computing platforms, e.g., servers, etc., which may provide an apparatus 120. Apparatus 120 may, for example, be used, at least in part, to select or otherwise determine whether positioning data for a transmitting device 110 may or may not be used in a positioning function, in accordance with an implementation.

Also illustrated in FIG. 1, are communication links 136-1 and 136-2 which may represent one or more wireless signals (unidirectional or bidirectional) that may be transmitted between transmitting device 110 and mobile station 102, and/or between transmitting device 110 and one or more other devices 106. In certain instances, communication link 136-2 may comprise a wired communication link, e.g., via network(s) 104. Another communication link 138 is illustrated which may represent one or more wireless signals (unidirectional or bidirectional) transmitted between mobile station 102 and network(s) 104. Another communication link 140 is illustrated which may represent one or more wired and/or wireless signals (unidirectional or bidirectional) transmitted between one or more other devices 106 and network(s) 104.

Figure 2:
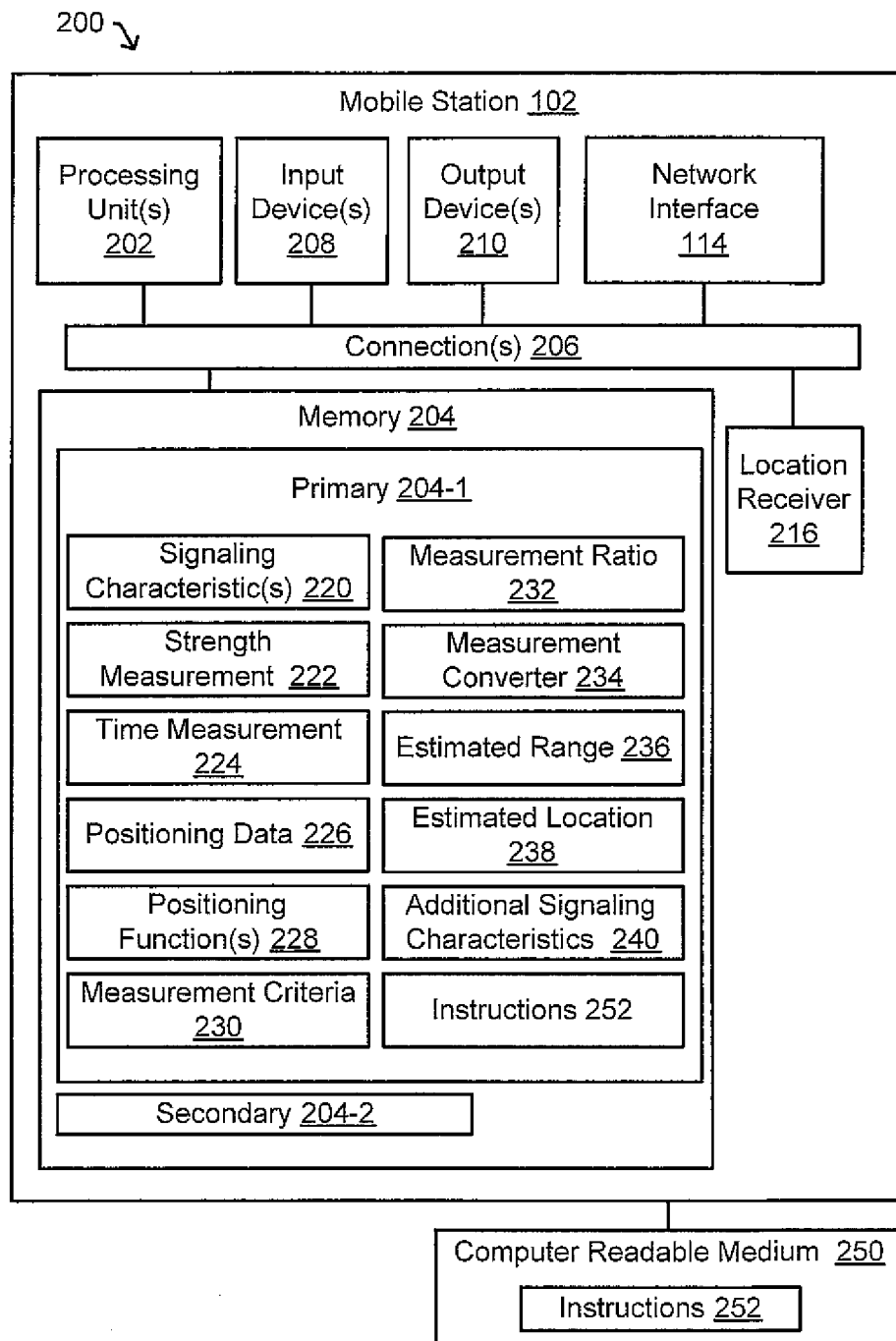
FIG. 2 is a schematic block diagram illustrating certain features of an example computing platform in the form of a mobile station to select or otherwise determine whether positioning data for a transmitting device may or may not be used in a positioning function, in accordance with an implementation.

FIG. 2 is a schematic block diagram illustrating certain features of an example computing platform 200 shown in the form of mobile station 102 for use in selecting or otherwise determining whether positioning data 226 for a transmitting device 110 may or may not be used in one or more positioning functions 228, in accordance with an implementation.

As illustrated mobile station 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile station 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 250. Memory 204 and/or computer readable medium 250 may comprise instructions 252 associated with data processing, e.g., in accordance with the techniques and/or apparatus 116 (FIG. 1), as provided herein.

Mobile station 102 may, for example, further comprise one or more user input devices 208, one or more output devices 210, one or more network interfaces 114, and/or one or more location receivers 216.

Input device(s) 208 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 114 may, for example, provide connectivity to one or more transmitting devices 110 and/or network(s) 104 (FIG. 1), e.g., via one or more communication links. Location receiver 216 may, for example, obtain signals from one or more location services, GPS, etc. (not shown), which may be used in estimating a location of mobile station 102 at certain times.

Processing unit(s) 202 and/or instructions 252 may, for example, provide or otherwise be associated with one or more encoded electrical signals stored in memory 204, such as, one or more signaling characteristics 220, one or more received signal strength measurements 222, one or more propagation time measurements 224, positioning data 226, instructions and/or data for or supportive of one or more positioning functions 228, one or more measurement criteria 230, one or more measurement ratios 232, instructions and/or data for or supportive of one or more measurement converter functions 234 (e.g., to convert one or more values to a particular unit of measure), one or more estimated ranges 236 (e.g., from a mobile station to some transmitting device, an object indicated in a map, a coordinate point, a region, a structure, etc.), one or more estimated locations 238 (e.g., of a mobile station with regard to a transmitting device, an object indicated in a map, a coordinate point, a region, a structure, etc.), one or more additional signaling characteristics 240, and/or the like or any combination thereof, e.g., as described in the various example techniques herein.

In certain instances, positioning function(s) 228 may, for example, comprise all or part of a positioning function, a navigation function, a location based service function, or the like or any combination thereof. For example, one or more positioning functions may be used, at least in part, to estimate a location of mobile station 102 within or with regard to at least one indoor region. For example, one or more positioning functions may consider positioning data 226 for one or more selected transmitting devices 110. For example, estimating a location of mobile station 102 may comprise, at least in part, determining coordinates for an estimated location of mobile station 102 with regard to some coordinate system. For example, estimating a location of mobile station 102 may comprise, at least in part, determining a position of mobile station 102 relative to one or more transmitting devices 110, an indoor region 132, a structure 130, and/or some object, service, point of interest, etc., therein or there about (e.g., as may be indicated in an electronic map. For example, estimating a location of mobile station 102 may comprise, at least in part, determining a movement (e.g., heading, velocity, etc.) or lack thereof of mobile station 102, e.g., into, out of, or within at least one indoor region, or with regard to a coordinate system, and/or the like or any combination thereof.

Figure 3:
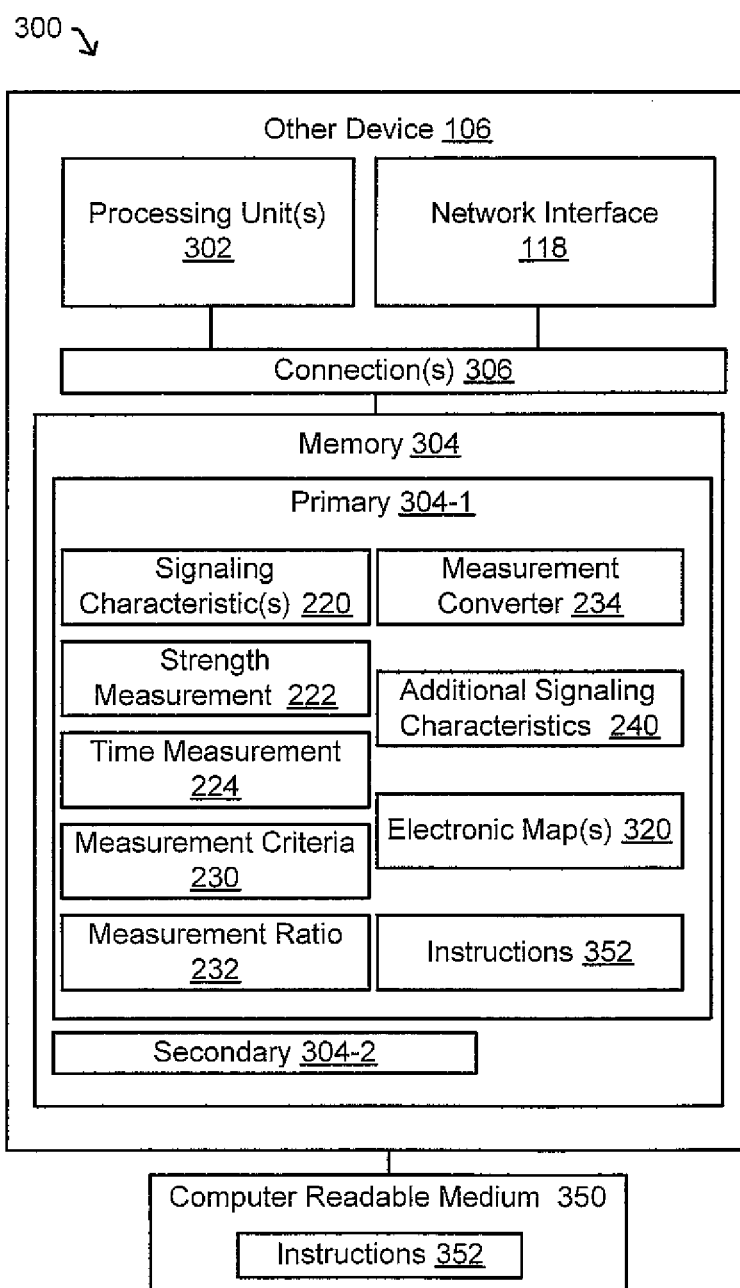
FIG. 3 is a schematic block diagram illustrating certain features of an example computing platform for use in one or more devices to select or otherwise determine whether positioning data for a transmitting device may or may not be used in a positioning function, in accordance with an implementation.

FIG. 3 is a schematic block diagram illustrating certain features of an example computing platform 300 for use one or more other devices 106 that may be used in selecting or otherwise determining whether positioning data 226 for a transmitting device 110 may or may not be used in one or more positioning functions 228, in accordance with an implementation. Note that in certain instances, one or more positioning functions 228, which are illustrated in FIG. 2 in mobile station 102, may be alternatively or by way of augmentation provided, in whole or part, in one or more other devices 106.

As illustrated computing platform 300 may comprise one or more processing units 302 to perform data processing (e.g., in accordance with the techniques provided herein) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within computing platform 300. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 350. Memory 304 and/or computer readable medium 350 may comprise instructions 352 associated with data processing, e.g., in accordance with the techniques and/or apparatuses 116 and/or 120 (FIG. 1), as provided herein.

Computing platform 300 may, for example, further comprise one or more network interfaces 118. A network interface 118 may, for example, provide connectivity to network(s) 104, mobile station 102, and/or transmitting devices 110 (FIG. 1), e.g., via one or more wired and/or wireless communication links.

Processing unit(s) 302 and/or instructions 352 may, for example, provide or otherwise be associated with one or more encoded electrical signals stored in memory 304, such as, one or more signaling characteristics 220, one or more received signal strength measurements 222, one or more propagation time measurements 224, one or more measurement criteria 230, one or more measurement ratios 232, instructions and/or data for or supportive of one or more measurement converter functions 234, one or more additional signaling characteristics 240, one or more electronic maps 320, and/or the like or any combination thereof, e.g., as described in the various example techniques herein. Although not shown in FIG. 3, it should be understood that positioning data 226, instructions and/or data for or supportive of one or more positioning functions 228, one or more estimated ranges 236, one or more estimated locations 238, and/or other like information stored or used in example mobile device 102 of FIG. 2 may be provided, at times, in memory 304.

Figure 4:
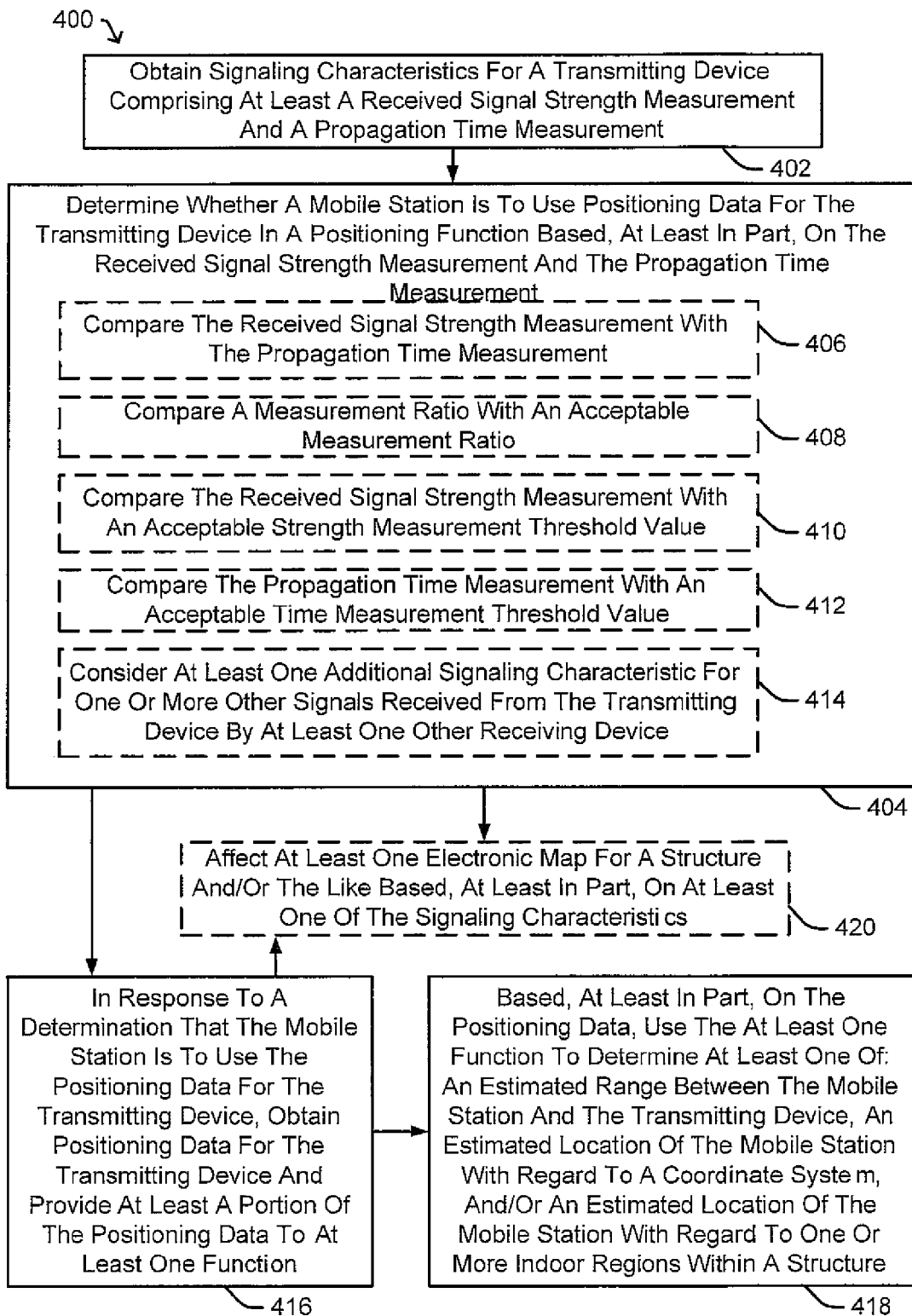
FIG. 4 is a flow diagram illustrating certain features of an example process or method for use in one or more computing platforms to select or otherwise determine whether positioning data for a transmitting device may or may not be used in a positioning function, in accordance with an implementation.

FIG. 4 is a flow diagram illustrating certain features of an example process or method 400 for use, in whole or part, at one or more computing platforms (e.g., a mobile station 102, and/or one or more other devices 106) in selecting or otherwise determining whether positioning data 226 for a transmitting device 110 may or may not be used in one or more positioning functions 228, in accordance with an implementation.

At example block 402, signaling characteristics 220 for a transmitting device 110 may be obtained, which comprise at least a received signal strength measurement 222 and a propagation time measurement 224. In certain example implementations, at block 402, a received signal strength measurement and/or a propagation time measurement may be adjusted in some manner and/or converted to a shared unit of measure, e.g., using a measurement converter function 234, etc.

At example block 404, it may be determined whether a mobile station is to use positioning data 226 for a transmitting device 110 in a positioning function 228 based, at least in part, on the received signal strength measurement 222 and the propagation time measurement 224. For example, in certain instances at block 406, a received signal strength measurement may be compared with a propagation time measurement. For example, in certain instances at block 408, a measurement ratio 232 may be obtained and compared with an acceptable measurement ratio, e.g., one or more threshold values represented by measurement criteria 230. For example, in certain instances at block 410, a received signal strength measurement 222 may be compared with an acceptable strength measurement threshold value, e.g., one or more threshold values represented by measurement criteria 230. For example, in certain instances at block 412, a propagation time measurement 224 may be compared with an acceptable time measurement threshold value, e.g., one or more threshold values represented by measurement criteria 230. In certain example implementations, as shown at block 414, a determination made at block 404 may further consider at least one additional signaling characteristic, e.g., for one or more other signals received from a transmitting device by at least one other receiving device (e.g., as gathered using various mobile stations, access points, etc.).

At example block 416, in response to a determination that a mobile station 102 is to use positioning data 226 for a transmitting device 110, positioning data for the transmitting device may be obtained and at least a portion of the positioning data may be provided to at least one positioning function. In certain example implementations, at block 416, a mobile station 102 may receive one or more signals from a selected transmitting device. Such received signal(s) may then be used to establish positioning data 226, e.g., at mobile station 102, and/or at one or more other devices 106. At least a portion of the resulting positioning data 226 may then be provided to at least one positioning function, e.g., at mobile station 102, and/or at one or more other devices 106.

At example block 418, based, at least in part, on the positioning data, at least one positioning function may be used to determine an estimated location of the mobile station 102. For example, at least one positioning function (e.g., at mobile station 102, and/or at one or more other devices 106) may be used to determine one or more of: an estimated range between the mobile station and the transmitting device, an estimated location of the mobile station with regard to a coordinate system, an estimated location of the mobile station with regard to one or more indoor regions within a structure, and/or the like.

In certain example implementations, as illustrated at block 420, at least one electronic map 320, e.g., for at least a portion of a structure 130, may be affected based, at least in part, on at least one of the signaling characteristics 220. For example, at block 420 a signal-based heatmap, attenuation map, signal reception model, and/or the like or combination thereof may be affected in some manner based, at least in part, on one or more signaling characteristics for a transmitting device (e.g., from blocks 402, 416), and/or possibly based on a decision from block 404. For example, information maintained in a map or model regarding a particular transmitter's signals, known or estimated location, identifier, schedule, etc., may be affected based on one or more signaling characteristics. For example, a listing of transmitting devices that may be considered reliable, unreliable, and/or classified in some manner, may be affected at block 420. In certain instances, information maintained in a map or model regarding a structure 130, region 132, or other objects therein may be affected based on one or more signaling characteristics. For example, certain information may be maintained that may be useful in selecting a particular positioning function and/or setting certain parameters that may be used within a positioning function based, at least in part, on information maintained in such a map or model regarding a structure 130, region 132, or other objects therein.

Figure 5:
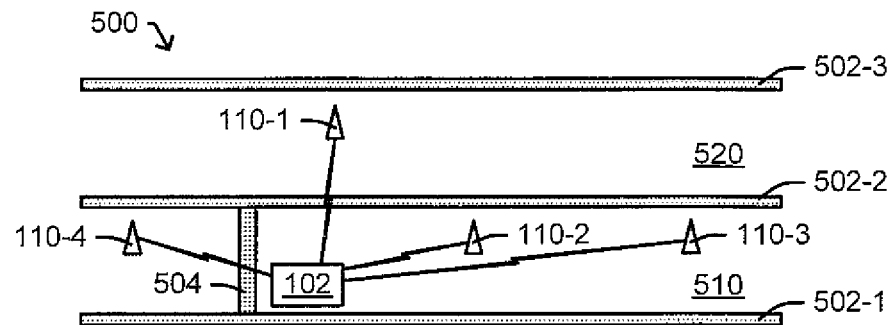
FIG. 5 is an illustrative diagram of an example structure having a plurality of transmitting devices, in accordance with an implementation.
Figure 6:
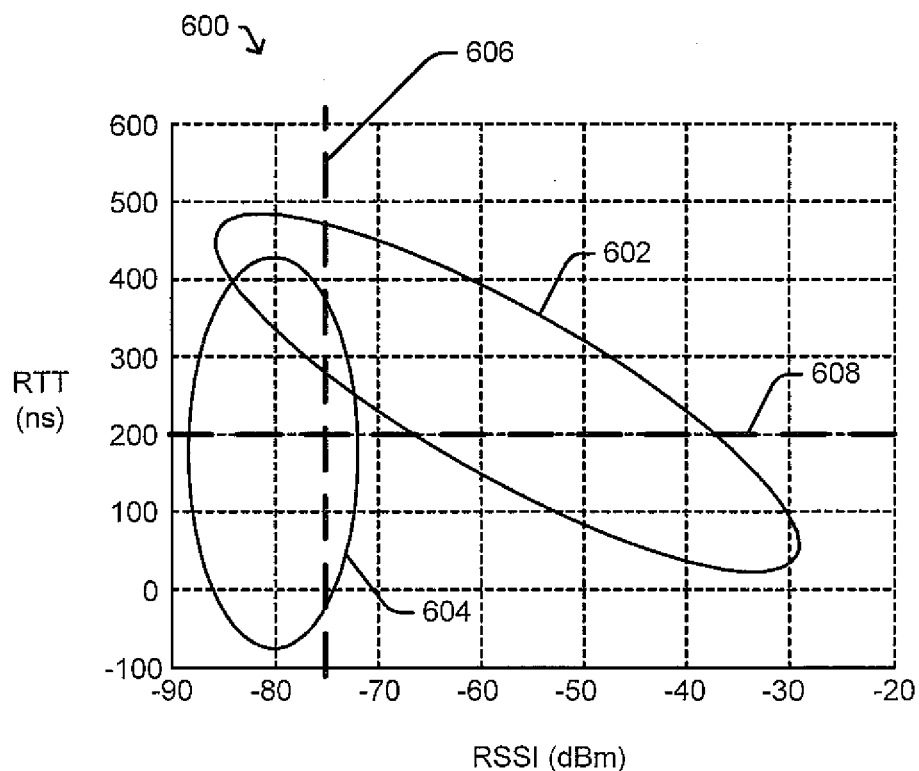
FIG. 6 is graph illustrating certain observations with regard to certain example signaling characteristics for signals received by a mobile station from various transmitting devices located at different locations within a structure, e.g., as in FIG. 5, in accordance with an implementation.

Reference is made next to FIG. 5 and FIG. 6, which further illustrate certain aspects of the techniques provided herein with regard to an example environment in which a receiving device may be located within one region of a structure and receive signals from various transmitting devices, and wherein certain transmitting devices may be selected or rejected for use with a positioning function.

FIG. 5 presents a cross-sectional view of part of a structure 500 which comprises at least two regions therein indicated as a first floor 510 which immediately below a second floor 520. More specifically, first floor 510 is between a horizontal floor support 502-1 and a horizontal floor support 502-2, and second floor 520 is between horizontal floor support 502-2 and a horizontal floor support 502-3. Also, shown in this example, is a vertical interior wall 504 which subdivides first floor 510. Additionally, a plurality of transmitting devices 110 are illustrated. Transmitting device 110-1 is illustrated as being located in second floor 520, roughly overhead of mobile station 102 which is located within first floor 510. As viewed in FIG. 5, transmitting devices 110-2 and 110-3 are to the right of mobile station 102 within first floor 510, with transmitting device 110-2 being about in the middle between mobile station 102 and transmitting device 110-3. Further, as viewed in FIG. 5, a transmitting device 110-4 is to the left of mobile station 102 within first floor 510, and interior wall 504 is located between mobile station 102 and transmitting device 110-4. Thus, given this example environment and arrangement, as further illustrated signals transmitted by transmitting devices 110-1 and 110-4 may propagate through various non-atmospheric material(s), namely, horizontal floor support 502-2 and interior wall 504, respectively. To the contrary, signals from transmitting devices 110-2 and 110-3 may be expected to propagate through mostly atmospheric materials to mobile station 102, assuming there are no other obstructing objects (e.g., objects or surfaces that absorb, scatter, reflect, or otherwise substantially affect signal propagation.).

In light of the different locations and corresponding transmission paths, certain signal characteristics of the various signals illustrated in FIG. 5 may vary significantly. For example, as expected an RSSI or corresponding or other like received signal strength measurement may be reduced predictably as a range (distance) between a transmitting device and a receiving device increases. Similarly, as expected a RTT or corresponding or other like propagation time measurement may also increase in a predictable manner as such range increases. However, the presence of a physical obstruction (or other like signal-affecting object) may further attenuate/block, delay, or otherwise affect a signal to further affect an RSSI and/or a RTT, etc. As such, accuracy and/or reliability of certain signal characteristics, e.g., as an indication of an estimated range between a transmitting device and receiving device, may be reduced.

Thus, for example, without such example obstructions/objects between a transmitting device and receiving device, certain signal characteristics may be used to more accurately useful in estimating a range between a transmitter and receiver. While the presence of an obstruction/object may attenuate a signal transmitted in such a path, and thus affect the accuracy of RSSI as an indicator of range, such an obstruction may not measurably affect an observed RTT or other like propagation time.

Thus, in a particular example implementation, a received signal strength measurement and a propagation time measurement for one or more signals transmitted by a transmitting device and received at a receiving device may be compared or otherwise considered to determine, for example, whether the received signal strength measurement and the propagation time measurement are indicative of the same or different ranges (distances). An inconsistency may be detected, for example, if a range estimated based a received signal strength measurement is significantly greater than a range based on a corresponding propagation time measurement, it may be presumed that the signal path may have been significantly obstructed in some manner.

By way of a simplified example, attention is drawn next to FIG. 6, which is a simplified graph 600 illustrating certain observations with regard to certain example signaling characteristics for signals received by a mobile station from various transmitting devices located at different locations within a structure, e.g., as in FIG. 5, in accordance with an implementation. Graph 600 is, as with all of the examples presented herein, is not intended to limit claimed subject matter. Here, graph 600 is simply intended to demonstrate that under certain circumstances there may be recognizable differences between certain signaling characteristics for different transmitting devices, and that as such it may be possible to select certain transmitters for use or exclusion with regard to one or more positioning functions.

With this in mind, in graph 600, the vertical axis represents an RTT from −100 ns to +600 ns and the horizontal axis represents an RSSI from −90 dBm to −20 dBm. In this example, a first oval 602 is representative of an area within graph 600 in which a majority of plotted values for RTT and RSSI for signals received from transmitting devices that are co-located on the same floor as a receiving device. As shown, in this example, a second oval 604 is representative of an area within graph 600 in which a majority of plotted values for RTT and RSSI for signals received from transmitting devices that are located on a floor directly overhead of a receiving device. It should be noted, however, that while not shown in graph 600, there may be several plotted values for transmitting devices that do not fall within either of the illustrated ovals. Furthermore, the ovals are not intended to be mutually exclusive in either over-lapping or non-over-lapping areas. Instead, there may be a distribution of plotted values throughout graph 600, for measurements of signals from transmitting devices on the both floors. Nonetheless, in certain instances, there may appear to be groupings or patterns of plots which may occupy or cluster within discernable areas, identified here with the simplified shape of the first and second ovals.

As shown in this simple example, first oval 602 appears to be more horizontally extended in a downward slopping direction from plotted values exhibiting higher RTT values but lower RSSI values, to plotted values exhibiting lower RTT values but higher RSSI values. Second oval 604, in this example, is more vertically oriented and somewhat more tightly clustered than first oval 602 as a result of plotted values having a variety of lower to higher RTT values but mostly lower RSSI values.

Thus, in accordance with certain techniques as presented herein, it may be determined whether a mobile station may or may not use positioning data for a transmitting device in a positioning function based, at least in part, on a comparison of a received signal strength measurement and a propagation time measurement. For example, one or more acceptable measurement ratios (e.g., based on one or more thresholds, etc.) may be compared to a ratio of a received signal strength measurement to a propagation time measurement, or vise versa, to classify transmitters in some manner. For example, such a comparison may classify transmitters as being on the same or different floors (regions) than a receiving device. For example, such a comparison may classify transmitting devices as being presumed more or less reliable for use in one or more positioning functions.

Similarly, individual signaling characteristics may be compared to applicable threshold values. For example, a received signal strength measurement may be compared to an acceptable strength measurement threshold value. A non-limiting example of an acceptable strength measurement threshold value is indicated in graph 600 by line 606 which corresponds to approximately −75 dBm. Thus, with respect to the clustering of plots represented by first oval 602 and second oval 604, it can been seen that many of the RSSI values for signals from transmitting devices on the same floor as a mobile station have RSSI values greater than the example threshold value and as such may fall within first oval 602, while many of the RSSI values for signals from transmitting devices on the overhead floor are less than the example threshold value and as such may fall within second oval 604. Accordingly, transmitting devices may be categorized, at least in part, based on one or more acceptable strength measurement threshold values.

In another example, a propagation time measurement may be compared to an acceptable time measurement threshold value. A non-limiting example of an acceptable time measurement threshold value is indicated in graph 600 by line 608 which corresponds to approximately +200 ns. Thus, with respect to the clustering of plots represented by first oval 602 and second oval 604, it can been seen that many of the RTT values for signals returned from transmitters on the same floor as a mobile station have RTT values greater than the example threshold value and as such may fall within first oval 602, while many of the RSSI values for signals returned from transmitters on the overhead floor are less than the example threshold value and as such may fall within second oval 604. Additionally, it may be noted that signals erroneously exhibiting an RTT that is a negative value may be removed or not considered.

By way of further example, as illustrated in graph 600, the example threshold values may be used to divide plotted values into two or more classifications (here, for example, lines 606 and 608 divide the area in graph 600 into four quadrants). Hence, it may be possible in certain instances to only select/reject transmitters from certain classifications, or to implement some priority scheme based on such classifications resulting from various comparisons.

In certain example implementations, one or more threshold values may be predetermined or dynamically determined. For example, a threshold value may initially be set to a more restrictive value and possibly subsequently eased or otherwise affected to be less restrictive. For example, a threshold value may be set of affect in some manner based, at least in part, on a particular estimated location, some historical or learned factors, a date or time, a mode of operation e.g., of a transmitting device and/or a receiving device), a selected signaling model, an electronic map and/or the like, etc.

Returning briefly to the example in FIG. 5 and using graph 600, it may be the case in certain instances that signaling characteristics for transmitting device 110-1 and transmitting device 110-4 may fall closer to or within second oval 604 since they may relate to a relatively fast RTT value given their proximity to mobile station 102 and because they may have a relatively lower RSSI value given the floor and wall obstructions that the respective signals pass through. To the contrary and in comparison, it may be the case in certain instances that signaling characteristics for transmitting device 110-2 and transmitting device 110-3 may fall closer to or within first oval 602 even although they may have differing RTT values given their respective distances from mobile station 102 and which may even be similar to those for transmitting devices 110-1 and 110-4. Here, for example, the RSSI values for transmitting devices 110-2 and 110-3 may be relatively higher RSSI given the lack of obstructions that the signals pass through, and hence signaling characteristics for transmitting device 110-2 and transmitting device 110-3 may fall closer to or within first oval 602. Accordingly, it may be beneficial to selectively use positioning data obtained from signals received from transmitting devices 110-2 and 110-3 and/or reject or avoid the use of positioning data obtained from signals received from transmitting device 110-1 and/or transmitting device 110-4, e.g., when performing certain positioning functions.

Thus, in certain further example implementations, if there is an inconsistency between a received signal strength measurement and a propagation time measurement (e.g., inconsistent distances, one or more values falling above or below a threshold value, etc.) an appropriate course of action may be taken. In one implementation, a detected inconsistency between a received signal strength measurement and a propagation time measurement may lead to an inference that the applicable transmitting device and receiving device are on different floors. In another implementation, a particular ranging model (e.g., used in a positioning function) may be selected and/or possibly affected in some manner based upon a comparison of a received signal strength measurement and a propagation time measurement. Here, if a received signal strength measurement indicates a range which is significantly longer than a range indicated by a propagation time measurement, a different attenuation model may be selected/applied in obtaining a range to a transmitter based upon the a received signal strength measurement. In yet another implementation, a detected inconsistency may be used exclude signals transmitted by the associated transmitting device for use in estimating a location of mobile station, e.g., assuming that positioning data for a sufficient number of "reliable" transmitting devices is available.

In another particular implementation, various signaling measurements may be obtained from several receiving devices (e.g., using crowd-sourcing techniques) and used to identify transmitting devices that may (or may not) be used by other, possibly non-RTT enabled, mobile devices, etc. Here, for example, an RSSI-based received signal strength measurement and an RTT-based propagation time measurement of signals from a particular transmitting device may be correlated with locations in an electronic map or the like, which may then be provided to other likely receiving devices. As such, for example, should a receiving device that may be non-RTT enabled be at or nearby an applicable structure or region, the receiving device may (e.g., based, at least in part, on an electronic map or the like) selectively ignore certain signals and/or positioning data (e.g., RSSI measurements) or possibly apply a different attenuation model, etc. Crowd-sourced information or the like may also be used, for example, to train a server and/or other Like resource to better characterize an RSSI/RTT or other like signal characteristic relationship, e.g., to more quickly and accurately determine which transmitting devices may or may not to be useful for RSSI ranging, etc., at or nearby a particular location.

In certain example implementations, crowd-source or other like gathered signal characteristics may be collected from various devices to further tune certain threshold values, models, etc., e.g., to better fit characteristics of a given structure. Such information may also allow for certain non-RTT enabled mobile devices to more intelligently select or reject which transmitting devices to use in one or more positioning functions. For example, as previously mentioned, an electronic map or other like information may be maintained and shared, and which may, at least in part, be indicative of "reliable" or "unreliable" transmitting devices at or nearby certain locations, structures, regions, etc. In certain further instances, it may also be possible to accurately and quickly determine a presence of a newly installed transmitting device. For example, in certain instances if a new transmitting device is observed which exhibits a strong correlation of observed RSSI and RTT measurements with another known transmitting device than it may be determined that the new transmitting device may be in or nearby a particular location, region, etc.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "maintaining" and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with at least one computing platform:
    obtaining signaling characteristics for one or more transmitting devices, said signaling characteristics being based, at least in part, on one or more signals received by a receiving device from said one or more transmitting devices, and comprising at least a received signal strength measurement and a propagation time measurement;
    determining that said one or more transmitting devices is located within or nearby a particular level of a structure comprising a plurality of levels based, at least in part, on a comparison of said received signal strength measurement with said propagation time measurement, wherein said determining further comprises:
        obtaining a measurement ratio that is based, at least in part, on said received signal strength measurement and said propagation time measurement; and
        comparing said measurement ratio with an acceptable measurement ratio; and
    excluding at least one of said one or more transmitting devices from use in a positioning function by a mobile station based, at least in part, on said comparison, while said mobile station is located within one or more of said plurality of levels.

2. The method as recited in claim 1, wherein said plurality of levels comprise a plurality of different floors or levels within said structure.

3. The method as recited in claim 1, and further comprising:
    determining that said one or more transmitting devices is located within or nearby said particular level of said structure based further, at least in part, on at least one measurement criteria.

4. The method as recited in claim 3, wherein said at least one measurement criteria comprises said acceptable measurement ratio.

5. The method as recited in claim 3, wherein said at least one measurement criteria comprises at least one of: an acceptable strength measurement threshold value, or an acceptable time measurement threshold value; and
    wherein determining that said one or more transmitting devices is located within or nearby said particular level of said structure comprises at least one of:

comparing said received signal strength measurement with said acceptable strength measurement threshold value; or comparing said propagation time measurement with said acceptable time measurement threshold value.

6. The method as recited in claim 1, and further comprising:
converting at least one of: said received signal strength measurement and/or said propagation time measurement to a particular unit of measure.

7. The method as recited in claim 1, and further comprising, with said at least one computing platform:
in response to identifying that said mobile station is to use said positioning data for said one or more transmitting devices in said positioning function, obtaining said positioning data for said one or more transmitting devices and providing said positioning data to said positioning function.

8. The method as recited in claim 7, wherein said mobile station comprises said at least one computing platform, and further comprising, with said at least one computing platform:
based, at least in part, on said positioning data, using said positioning function to determine at least one of: an estimated range between said mobile station and said one or more transmitting devices; or an estimated location of said mobile station with regard to a coordinate system; or an estimated location of said mobile station with regard to one or more of said plurality of levels within said structure.

9. The method as recited in claim 1, and further comprising, with said at least one computing platform:
obtaining at least one additional signaling characteristic for one or more other signals received from said one or more transmitting devices by at least one other receiving device; and wherein that said one or more transmitting devices is located within or nearby said particular level of said structure is further based, at least in part, on said at least one additional signaling characteristic.

10. The method as recited in claim 1, and further comprising, with said at least one computing platform:
affecting at least one electronic map for said structure based, at least in part, on at least one of said signaling characteristics for said one or more transmitting devices.

11. The method as recited in claim 1, wherein said mobile station comprises at least one of: said receiving device, or said at least one computing platform.

12. An apparatus for use in at least one computing platform, said apparatus comprising:
means for obtaining signaling characteristics for one or more transmitting devices, said signaling characteristics being based, at least in part, on one or more signals received by a receiving device from said one or more transmitting devices, and comprising at least a received signal strength measurement and a propagation time measurement;
means for determining that said one or more transmitting devices is located within or nearby a particular level of a structure comprising a plurality of levels based, at least in part, on a comparison of said received signal strength measurement with said propagation time measurement, wherein said means for determining further comprises:
means for obtaining a measurement ratio that is based, at least in part, on said received signal strength measurement and said propagation time measurement; and
means for comparing said measurement ratio with an acceptable measurement ratio; and
means for excluding at least one of said one or more transmitting devices from use in a positioning function by a mobile station based, at least in part, on said comparison, while said mobile station is located within one or more of said plurality of levels.

13. The apparatus as recited in claim 12, wherein said plurality of levels comprise a plurality of different floors or levels within said structure.

14. The apparatus as recited in claim 12, said means for determining that said one or more transmitting devices is located within or nearby said particular level of said structure being further based, at least in part, on at least one measurement criteria.

15. The apparatus as recited in claim 14, wherein said at least one measurement criteria comprises said acceptable measurement ratio.

16. The apparatus as recited in claim 14, wherein said at least one measurement criteria comprises at least one of: an acceptable strength measurement threshold value, or an acceptable time measurement threshold value; and
wherein said means for determining that said one or more transmitting devices is located within or nearby said particular level of said structure further comprises at least one of:
means for comparing said received signal strength measurement with said acceptable strength measurement threshold value; or
means for comparing said propagation time measurement with said acceptable time measurement threshold value.

17. The apparatus as recited in claim 12, and further comprising:
means for converting at least one of: said received signal strength measurement and/or said propagation time measurement to a particular unit of measure.

18. The apparatus as recited in claim 12, and further comprising:
means for obtaining at least one additional signaling characteristic for one or more other signals received from said one or more transmitting devices by at least one other receiving device; and
wherein said means for determining that said one or more transmitting devices is located within or nearby said particular level of said structure being further based, at least in part, on said at least one additional signaling characteristic.

19. The apparatus as recited in claim 12, and further comprising:
means for affecting at least one electronic map for said structure based, at least in part, on at least one of said signaling characteristics for said one or more transmitting devices.

20. The apparatus as recited in claim 12, wherein said mobile station comprises at least one of: said receiving device, or said at least one computing platform.

21. An apparatus comprising:
a network interface; and
a processing unit to:
obtain signaling characteristics for one or more transmitting devices, said signaling characteristics being based, at least in part, on one or more signals received by a receiving device from said one or more transmitting devices, and comprising at least a received signal strength measurement and a propagation time measurement;

determine that said one or more transmitting devices is located within or nearby a particular level of a structure comprising a plurality of levels based, at least in part, on a comparison of said received signal strength measurement with said propagation time measurement;

determine that said one or more transmitting devices is located within or nearby said particular level of said structure is further based, at least in part, on a comparison of a measurement ratio with an acceptable measurement ratio, said measurement ratio being based, at least in part, on said received signal strength measurement and said propagation time measurement; and exclude at least one of said one or more transmitting devices from use in a positioning function by a mobile station based, at least in part, on said comparison, while said mobile station is located within one or more of said plurality of levels.

22. The apparatus as recited in claim 21, wherein said plurality of levels comprise a plurality of different floors or levels within said structure.

23. The apparatus as recited in claim 21, said processing unit to determine that said one or more transmitting devices is located within or nearby said particular level of said structure is further based, at least in part, on at least one measurement criteria.

24. The apparatus as recited in claim 23, wherein said at least one measurement criteria comprises said acceptable measurement ratio.

25. The apparatus as recited in claim 23, wherein said at least one measurement criteria comprises at least one of: an acceptable strength measurement threshold value, or an acceptable time measurement threshold value; and said processing unit to determine that said one or more transmitting devices is located within or nearby said particular level of said structure is further based, at least in part, on at least one of:
a first comparison of said received signal strength measurement with said acceptable strength measurement threshold value; or
a second comparison of said propagation time measurement with said acceptable time measurement threshold value.

26. The apparatus as recited in claim 21, said processing unit to convert at least one of: said received signal strength measurement and/or said propagation time measurement to a particular unit of measure.

27. The apparatus as recited in claim 21, said processing unit to determine that said one or more transmitting devices is located within or nearby said particular level of said structure is further based, at least in part, on at least one additional signaling characteristic for one or more other signals received from said one or more transmitting devices by at least one other receiving device and obtained, via said network interface.

28. The apparatus as recited in claim 21, said processing unit to further:
affect at least one electronic map for said structure based, at least in part, on at least one of said signaling characteristics for said one or more transmitting devices.

29. The apparatus as recited in claim 21, wherein said apparatus comprises at least one of: said mobile station, or said receiving device.

30. The apparatus as recited in claim 29, said processing unit to further:
based, at least in part, on said positioning data, perform at least a portion of said positioning function to determine at least one of: an estimated range between said mobile station and said one or more transmitting devices; or an estimated location of said mobile station with regard to a coordinate system; or an estimated location of said mobile station with regard to one or more indoor levels within a structure.

31. An article comprising:
a non-transitory computer readable medium having stored therein computer implementable instructions that are executable by a special purpose computing platform to:
obtain signaling characteristics for one or more transmitting devices, said signaling characteristics being based, at least in part, on one or more signals received by a receiving device from said one or more transmitting devices, and comprising at least a received signal strength measurement and a propagation time measurement;

determine that said one or more transmitting devices is located within or nearby a particular level of a structure comprising a plurality of levels based, at least in part, on a comparison of said received signal strength measurement with said propagation time measurement;

determine that said one or more transmitting devices is located within or nearby said particular level of said structure is further based, at least in part, on a comparison of a measurement ratio with an acceptable measurement ratio, said measurement ratio being based, at least in part, on said received signal strength measurement and said propagation time measurement; and exclude at least one of said one or more transmitting devices from use in a positioning function by a mobile station based, at least in part, on said comparison, while said mobile station is located within one or more of said plurality of levels.

32. The article as recited in claim 31, wherein said plurality of levels comprise a plurality of different floors or levels within said structure.

33. The article as recited in claim 31, said computer implementable instructions being further executable by said special purpose computing platform to:
determine that said one or more transmitting devices is located within or nearby said particular level of said structure is further based, at least in part, on at least one measurement criteria.

34. The article as recited in claim 33, wherein said at least one measurement criteria comprises said acceptable measurement ratio.

35. The article as recited in claim 33, wherein said at least one measurement criteria comprises at least one of: an acceptable strength measurement threshold value, or an acceptable time measurement threshold value; and said computer implementable instructions being further executable by said special purpose computing platform to determine that said one or more transmitting devices is located within or nearby said particular level of said structure is further based, at least in part, on at least one of:

a first comparison of said received signal strength measurement with said acceptable strength measurement threshold value; or a second comparison of said propagation time measurement with said acceptable time measurement threshold value.

36. The article as recited in claim 31, said computer implementable instructions being further executable by said special purpose computing platform to convert at least one of: said received signal strength measurement and/or said propagation time measurement to a particular unit of measure.

37. The article as recited in claim 31, said computer implementable instructions being further executable by said special purpose computing platform to determine that said one or more transmitting devices is located within or nearby said particular level of said structure is further based, at least in part, on at least one additional signaling characteristic for one or more other signals received from said one or more transmitting devices by at least one other receiving device and obtained, via said network interface.

38. The article as recited in claim 31, said computer implementable instructions being further executable by said special purpose computing platform to:
affect at least one electronic map for said structure based, at least in part, on at least one of said signaling characteristics for said one or more transmitting devices.

39. The article as recited in claim 31, wherein said mobile station comprises said special purpose computing platform, and said computer implementable instructions being further executable by said special purpose computing platform to:
based, at least in part, on said positioning data, perform at least a portion of said positioning function to determine at least one of: an estimated range between said mobile station and said one or more transmitting devices; or an estimated location of said mobile station with regard to a coordinate system; or an estimated location of said mobile station with regard to one or more indoor levels within a structure.

40. The article as recited in claim 31, wherein said mobile station comprises at least one of: said receiving device, or said special purpose computing platform.

* * * * *